United States Patent Office 3,846,255
Patented Nov. 5, 1974

3,846,255
SEPARATING PHENOL FROM PHENOL-WATER SUBAZEOTROPE BY TREATMENT WITH BRINE
Francis J. Sisk, Pittsburgh, Pa., assignor to Westinghouse Electric Corporation, Pittsburgh, Pa.
Filed Apr. 4, 1972, Ser. No. 240,917
Int. Cl. C07c 29/26
U.S. Cl. 203—18         17 Claims

ABSTRACT OF THE DISCLOSURE

A distilling column, condenser, reboiler, evaporator, and heater are combined to separate phenol from a flushing liquor containing a phenol-water subazeotrope.

Brine in the flushing liquor or brine added during start-up is recycled to avoid continually adding new brine to the system. The condenser and reboiler may be combined so that usually no additional heat is needed in the reboiler. The condensate from the condenser can be combined with brine and admitted to a decanter for more efficient separation of the phenol.

BACKGROUND OF THE INVENTION

As a result of various industrial operations including the production of steel, flushing liquors are produced which contain phenol. The phenol in these flushing liquors may be a product or a by-product but more usually it is simply a waste product which must be removed for pollution control.

A 9.8% solution of phenol in water forms a minimum-boiling azeotrope which has a boiling point of 99.2° C. at 1 atmosphere. If a subazeotrope (i.e., phenol less than the azeotropic percentage) is boiled the vapor will be higher in phenol than the remaining liquid. If the pressure is increased or an electrolyte (a salt) is added the azeotropic percentage of phenol increases from 9.8%, the boiling point of the azeotrope increases, and the difference between the percent of phenol in the vapor and the liquid increases. Thus, the phenol-rich vapor can be more easily separated from the flushing liquor if a salt is added to it and it is under pressure. Salt also reduces the number of transfer units required which means that a shorter column and less steam can be used. See U.S. Pats. 3,573,244 and 3,815,389.

SUMMARY OF THE INVENTION

I have found that phenol can be separated from a flushing liquor containing a subazeotrope of phenol and water without adding additional brine to the flushing liquor (other than at start-up), by recycling the brine. Not only is the trouble and expense of adding brine eliminated, but also far less waste brine is produced.

A condenser condenses phenol-rich vapors from a distilling column and provides sufficient heat to boil the bottom liquor from the column when a pressure difference is provided between the vapors and the bottom liquor. This eliminates the addition of raw steam to the column thus saving steam and heat.

Finally, the efficiency of the entire separation process is increased by adding recycled brine to the phenol-rich condensate from the condenser which causes two liquid phases to form. The phases are separated in a decanter yielding a phenol-rich product and a water-rich decantate which is returned to the distilling column. So efficient is the separation process that a flushing liquor containing up to the azeotropic percentage of phenol can be separated into water-rich product containing about 50 p.p.m. phenol or less and a phenol-rich product containing 70 to 85% phenol (all percentages herein are by weight unless otherwise stated).

THE DRAWINGS

Description of the Invention

A typical flushing liquor will contain about 0.1 to 0.3% phenol and about 0.4 to about 0.6% of a salt, commonly ammonium chloride. If the flushing liquor contains even a very small amount of salt it can be eventually concentrated in the system to the level desired for recycling. However, it is usually better to add a salt during start-up to avoid operating the system at less than peak efficiency. Sodium chloride is the preferred salt as it is inexpensive, neutral, and safe. Although the term "salt" is used herein it should be understood that any electrolyte, for example sulfuric acid, could also be used, although its corrosiveness generally makes it impractical.

Figure 1:
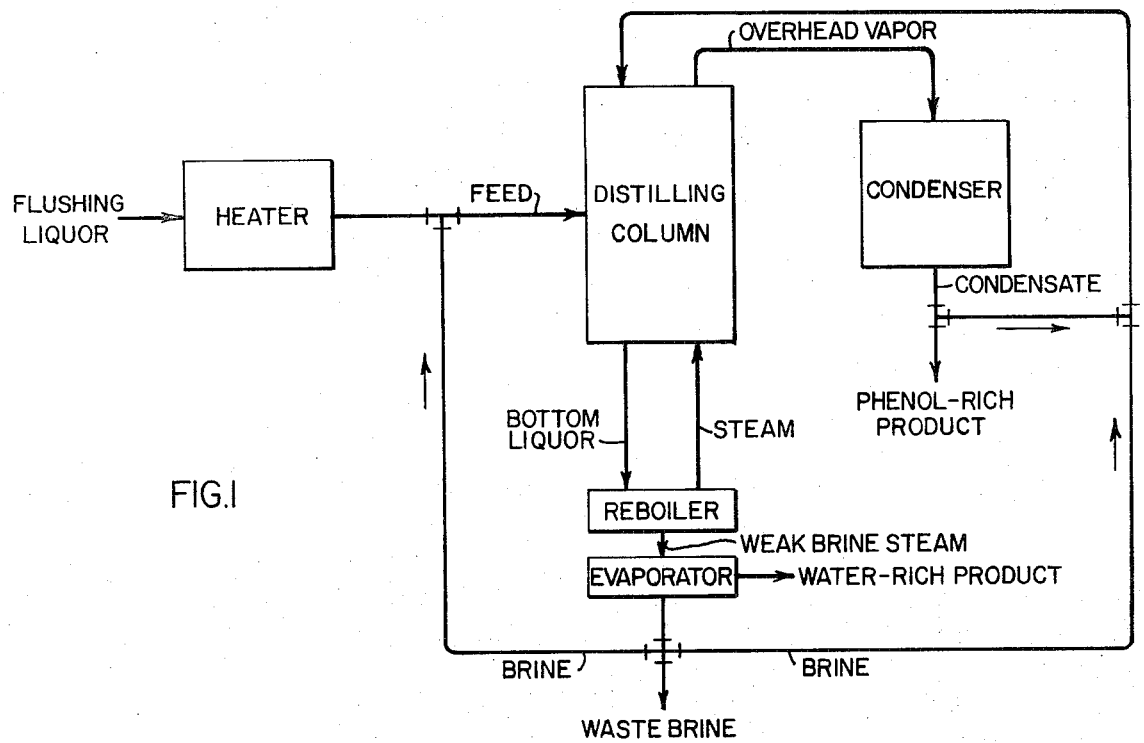
FIG. 1 is a schematic drawing which illustrates the general principles of this invention.

In FIG. 1 a flushing liquor is heated in the heater from about 200 to about 300° F. and preferably to about 210 to about 214° F. The heated flushing liquor is mixed with sufficient heated recycled brine to give a salinity of about 2 to about 8%. If less than 2% salt is used the benefits are not worth the trouble of using it, and at more than 8% the cost of boiling it in the reboiler begins to exceed the benefit from having it in the column; about 4 to about 6% salt is the optimum range. This feed is admitted to the distilling column at a point where the phenol-water ratio in the feed is about equal to the phenol-water ratio in the column. The phenol-water ratio in the column is higher nearer the top and can be calculated by well-known techniques or measured experimentally.

The distilling column provides intimate contact between counterflowing liquid and vapor phases causing the vapor to become phenol-rich and the liquid water-rich. The column is nearly isothermal, but slightly cooler near the top. The temperature in the column is at about the boiling point of water, (about 212° F. at 1 atmosphere to about 319° F. at 6 atmospheres) and the pressure is at about 1 to about 6 atmospheres absolute. Low pressures reduce separation and high pressures increase the cost of the column and the best compromise of these opposing consideration is about 3 to about 4 atmospheres absolute.

The overhead vapor from the column is condensed in the condenser and is divided so that typically about 95% is returned to the column and any condensate not returned is the phenol-rich product, which is about 10 to 20% (typically about 16%) phenol. Before the condensate is returned to the column it is mixed with sufficient recycled brine to give it about the same salinity as the feed.

The bottom liquor from the column is boiled in the reboiler to produce the steam for the column and a weak brine stream. The volume of steam returned to column to provide the rising vapor phase is approximately equal to the volume of phenol vapor leaving the column at its partial pressure at that point.

The weak brine stream from the reboiler goes to the evaporator. The evaporator produces the water-rich product and a brine having a salinity of about 10 to 35%, typically about 25%. The evaporator differs from the reboiler in that it produces water vapor in several stages and is much more efficient as a concentrator than the reboiler. The first stage is at a high temperature and pressure and the vapor from the first stage is used to evaporate vapor in the second stage which is at a lower temperature and pressure, and so on for succeeding stages. The water-rich product can be used to provide some or all of the heat for the heater. As much brine from the evaporator as is needed is recycled and the remainder is the waste brine which contains the amount of salt which was in the flushing liquor. Connections may be made with pipes or tubing as is well known.

THE PREFERRED EMBODIMENT

Figure 2:
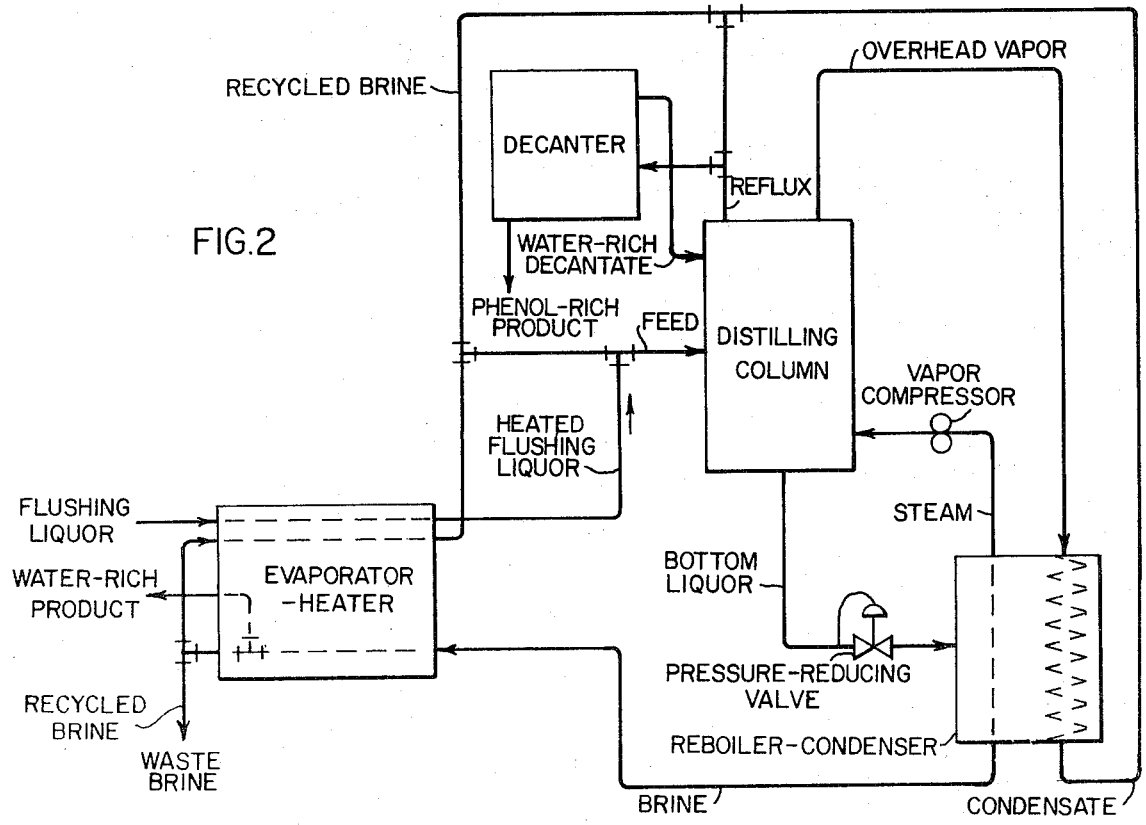
FIG. 2 is a schematic drawing which illustrates a certain presently preferred embodiment of this invention.

Refer now to the embodiment of FIG. 2. Statements made about FIG. 1 are also applicable to FIG. 2. However, the embodiment of FIG. 2 is far more efficient than the embodiment of FIG. 1 and therefore it is preferred.

In FIG. 2 the evaporator and heater have been combined into an evaporator-heater so that the flushing liquor is heated with heat from the evaporator which would otherwise be wasted. The flushing liquor is then mixed with recycled brine and is admitted to the distilling column.

The condenser and the reboiler are combined into the reboiler-condenser so that overhead vapor from the column condenses and, in doing so, heats the bottom liquor enough to provide the steam needed for the column. In order to enable the condensing vapor to boil a portion of the bottom liquor a vapor compressor is used on the steam line and a pressure-reducing valve is used on the bottom liquor line to create a pressure difference between the boiling bottom liquor and the condensing overhead vapor. The pressure difference should be great enough to provide a saturation temperature difference (i.e., boiling point drop) of about 5 to about 15° F. Alternatively, the pressure-reducing valve can be eliminated and the vapor compressor moved to the overhead vapor line, although the embodiment of FIG. 2 is preferred because steam presents fewer problems in handling in a vapor compressor than does the phenol-containing overhead vapor. Although the compressor will usually provide more than enough heat to compensate the system losses so that steam need not be added, under some conditions it may be necessary to add a small amount of additional heat to the reboiler-condenser. It may also be necessary to drain some of the steam if too much is produced.

The condensate from the reboiler-condenser is mixed with recycled brine and about 95 to about 99% of the brine-condensate mixture is returned to the top of the distilling column. The remaining mixture goes to the decanter where it is cooled to about room temperature. Cooling below the consolute temperature (about 250° F. at 65% phenol in a 5% salt solution) causes two phases to form in the decanter. The upper phase is the water-rich decantate and it contains about 2 to about 4% phenol at room temperature. This decantate is admitted to the distilling column at about a point where its phenol-water ratio is about equal to the phenol-water ratio of the liquid in the column. The lower phase is the phenol-rich product. It contains about 70 to about 85% phenol and can be sold to a phenol user.

The remaining bottom liquor from the reboiler-condenser, labeled "Brine" in FIG. 2, goes to the evaporator-heater where the water-rich product is boiled off. As much of the remaining brine as is needed is heated in the evaporator-heater and mixed with the feed and condensate as before described. The brine not used is the waste brine.

The following example further illustrates this invention.

Example

The flushing liquor to be treated is a mixture of 75 g.p.m. (gallons per minute) of liquor at 4000 p.p.m. phenol and 10,000 p.p.m. $NH_4Cl$ and 50 g.p.m. at 200 p.p.m. phenol. This is equivalent to a 3437.6 mols/hr. stream containing 6.978 mols/hr. $NH_4Cl$, and 1.6422 mols/hr. phenol.

The system of FIG. 2 is used as previously described except that the arrangement of FIG. 1 is used instead of the decanter. Reboiler heat is provided by condensing overhead vapor. Steam from the reboiler is compressed with a turbine driven compressor, the exhaust of which is used in the evaporator. Vapor compressor pressure rise is determined by pressure loss, boiling point elevation and reboiler approach. A multiple-effect evaporator with a single effect auxiliary concentrator is used. The distilling column is a 32 ft. packed column. The recycled brine stream has a salinity of 25%.

The following is the data for the operation. The figures are approximate and are given on a salt-free basis or salt-included basis as stated.

| | |
|---|---|
| Number of vapor transfer units above feed point | 7.57. |
| Number of vapor transfer units below feed point | 8.49. |
| Amount of brine added to feed (salt included) | 620.0 mols/hr. |
| Amount of feed+ brine to column (salt free) | 3992.9 mol/hr. |
| Phenol concentration in condensate | 0.05 mol fractions. |
| Amount of condensate recycled | 3102.0 mols/hr. |
| Amount of condensate not recycled | 32.672 mols/hr. |
| Liquid flow above feed point (salt free) | 3654.7 mols/hr. |
| Steam flow in column | 3134.6 mols/hr. |
| Phenol concentration of condensate+brine | 0.04244 mol fraction. |
| Amount of bottom liquor (salt free) | 7647.5 mols/hr. |
| Amount to heater-reboiler (salt free) | 4512.9 mols/hr. |
| Salt to heater-reboiler | 109.7 mol/hr. |
| Phenol concentration in feed to heater-reboiler | 0.00000191 mol fraction. |
| Salinity of stream to heater reboiler | 7.23%. |
| Power needed for vapor compression (29 to 35 p.s.i.a.) | 443 H.P. |
| Steam returned to column | 222.6 ft. 3/sec. |

I claim:

1. An apparatus for separating phenol from a composition containing up to about 8% of a salt and a subazeotropic mixture of phenol and water comprising:
   (A) a distilling column for producing an overhead vapor and a bottom liquor;
   (B) a condenser for condensing said overhead vapor to form a condensate;
   (C) a heater for heating said composition;
   (D) a reboiler for boiling a portion of said bottom liquor to produce steam;
   (E) an evaporator for evaporating a portion of said bottom liquor to produce brine and a water-rich product; and
   (F) connecting means to
      (1) mix a first portion of said brine with said composition;
      (2) admit said mixed first portion and composition to said distilling column at a point where the phenol-water ratio of said mixture is about equal to the phenol-water ratio of the liquid in said column;
      (3) mix a second portion of said brine with at least a portion of said condensate;
      (4) admit said mixed second portion and condensate to the top of said distilling column; and
      (5) admit at least a portion of said steam from said reboiler to the bottom of said distilling column.

2. An apparatus according to Claim 1 including a decanter wherein connecting means is provided to
   (1) mix all of said condensate with said second portion of said brine;
   (2) return about 95 to 99% of said mixture to the top of said distilling column;
   (3) admit about 1 to about 5% of said mixture to said decanter for cooling and separation into a phenol-rich product and a water-rich decantate; and (4) admit said water-rich decantate to said distilling column at about a point where the phenol-water ratio of said decantate is about equal to the phenol-water ratio of the liquid in said distilling column.

3. An apparatus according to Claim 1 wherein said condenser and said reboiler are combined and means are provided to maintain said overhead vapor at a greater pressure than said bottom liquor in said combined reboiler-condenser so that heat given off when said overhead vapor condenses boils a portion of said bottom liquor to produce said steam.

4. An apparatus according to Claim 3 wherein a vapor compressor compresses said steam which is admitted to the bottom of said distilling column and a pressure-reducing valve reduces the pressure of said bottom liquor before it enters said combined reboiler-condenser.

5. An apparatus according to Claim 3 wherein said evaporator and heater are combined so that heat from said evaporator is used to heat said composition in said heater.

6. A method of separating phenol from a composition containing a subazeotropic mixture of phenol and water comprising:

(A) heating said composition to about 200 to about 300° F.;

(B) mixing said composition with sufficient brine from step (J) to give a salinity of about 2 to about 8%;

(C) admitting said composition to a distilling column at about the point where the phenol-water ratio of said composition is about equal to the phenol-water ratio of the liquid in the distilling column;

(D) distilling said composition in said distilling column to produce an overhead vapor and a bottom liquor;

(E) condensing said overhead vapor to form a condensate;

(F) mixing at least about 95% of said condensate with sufficient brine from step (J) to give a salinity of about 2 to about 8%;

(G) admitting said mixed condensate to the top of said distilling column;

(H) boiling a portion of said bottom liquor to produce steam;

(I) admitting at least a portion of said steam to the bottom of said column; and (J) evaporating a portion of said bottom liquor to produce brine and a water-rich product.

7. A method according to Claim 6 wherein all of said condensate in step (E) is mixed with said brine in step (F) and about 95% to about 99% of said mixed condensate is admitted to the top of said distillation column and the remaining about 1 to about 5% is decanted to produce a phenol-rich product and a water-rich decantate, the latter of which is admitted to said distilling column at about a point where its phenol-water ratio is about equal to the phenol-water ratio of the liquid in the column.

8. A method according to Claim 6 wherein said overhead vapor is maintained at a greater pressure than said bottom liquor and heat given off when said overhead vapor is condensed is used to boil a portion of said bottom liquor to produce said steam.

9. A method according to Claim 8 wherein said steam is compressed and the pressure of said bottom liquor is reduced.

10. A method according to Claim 6 wherein said composition is heated at about 210 to about 214° F.

11. A method according to Claim 6 wherein the pressure in said distilling column is about 1 to about 6 atmospheres absolute.

12. A method according to Claim 11 wherein the pressure in said distilling column is about 3 to about 4 atmospheres absolute.

13. A method according to Claim 6 wherein the salinity in steps (B) and (F) is about 4 to about 6%.

14. A method according to Claim 6 wherein the salinity of the brine in step (J) is about 10 to about 35%.

15. A method according to Claim 6 wherein said composition is heated with the heat used in step (J).

16. An apparatus according to Claim 1 wherein said reboiler is external to distilling column, and bottom liquor from said reboiler passes to said evaporator.

17. A method according to Claim 6 wherein said portion of said bottom liquor is boiled to produce steam in a reboiler external to said distilling column and said bottom liquor which is not boiled in said reboiler is evaporated in step (J).

References Cited

UNITED STATES PATENTS

| | | | |
|---|---|---|---|
| 2,486,342 | 10/1949 | Taylor et al. | 203—18 |
| 2,573,244 | 10/1951 | Bogart | 203—53 |
| 2,327,643 | 8/1943 | Houghland | 203—26 |
| 2,912,365 | 11/1959 | Irvine | 203—26 |
| 3,607,668 | 9/1971 | Williamson | 203—26 |
| 2,179,991 | 11/1939 | Bright | 203—96 |
| 2,509,136 | 5/1950 | Cornel | 203—14 |
| 3,681,203 | 8/1972 | Shuzo Ohe | 203—53 |

FOREIGN PATENTS

| | | | |
|---|---|---|---|
| 805,048 | 11/1958 | England | 260—621 A |

NORMAN YUDKOFF, Primary Examiner

F. SEVER, Assistant Examiner

U.S. Cl. X.R.

203—95; 202—158; 260—621 A